INVENTOR:
Oscar B. Clemens
BY Cyrus W. Rice
ATTORNEYS.

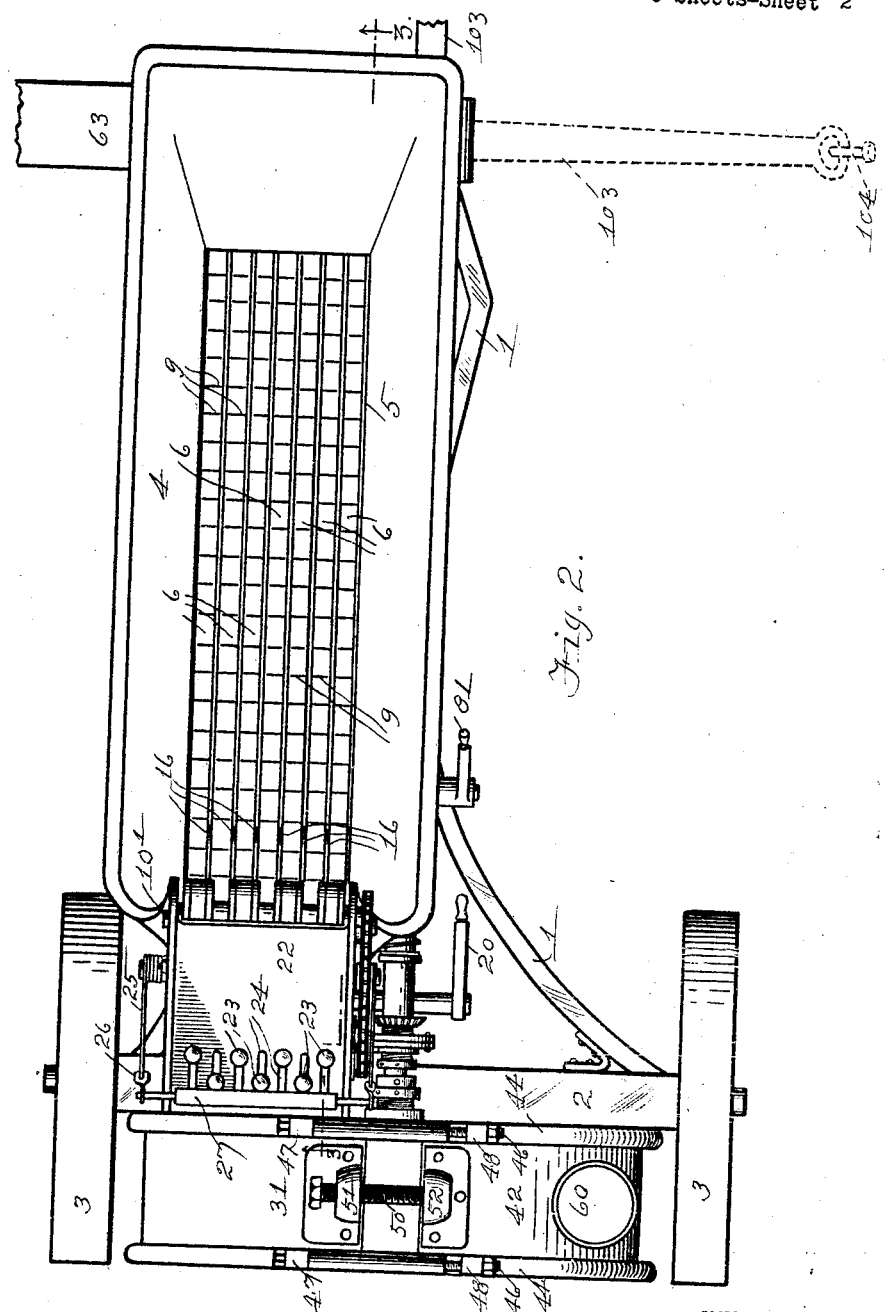

Jan. 24, 1928.
O. B. CLEMENS
1,657,109
FODDER CUTTER
Filed Aug. 12, 1926 5 Sheets-Sheet 3
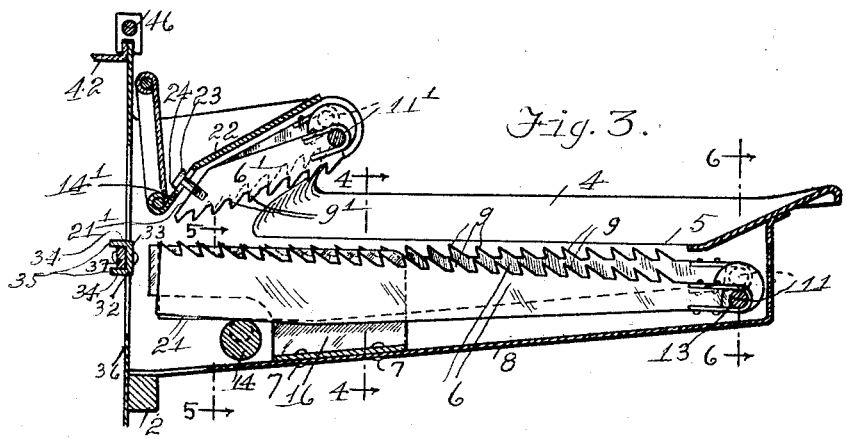
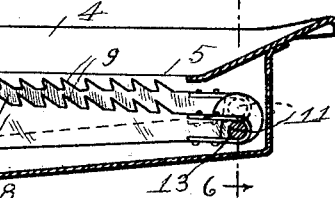
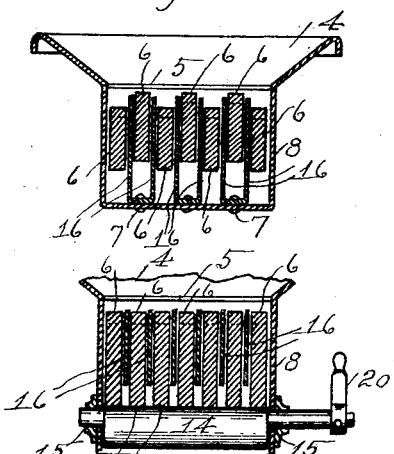
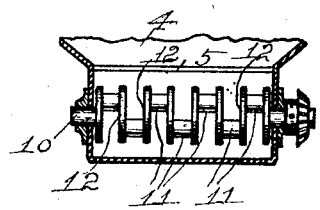
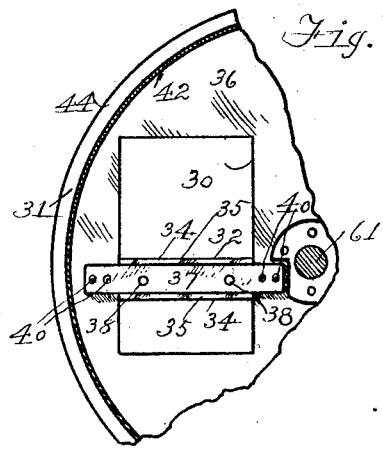
INVENTOR:
Oscar B. Clemens
BY
Cyrus W. Rice
ATTORNEYS.

Jan. 24, 1928.  O. B. CLEMENS  1,657,109
FODDER CUTTER
Filed Aug. 12, 1926   5 Sheets-Sheet 4

Witness:

INVENTOR:
Oscar B. Clemens.
BY Cyrus W. Rice
ATTORNEYS.

Jan. 24, 1928.
O. B. CLEMENS
1,657,109
FODDER CUTTER
Filed Aug. 12, 1926
5 Sheets-Sheet 5
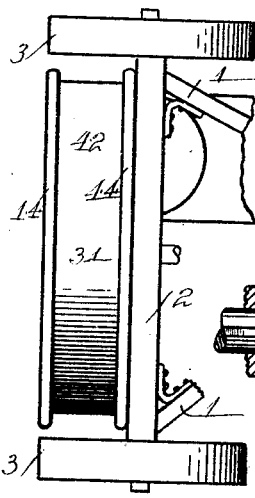
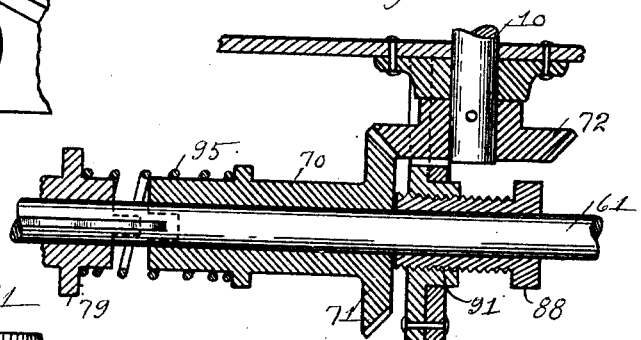
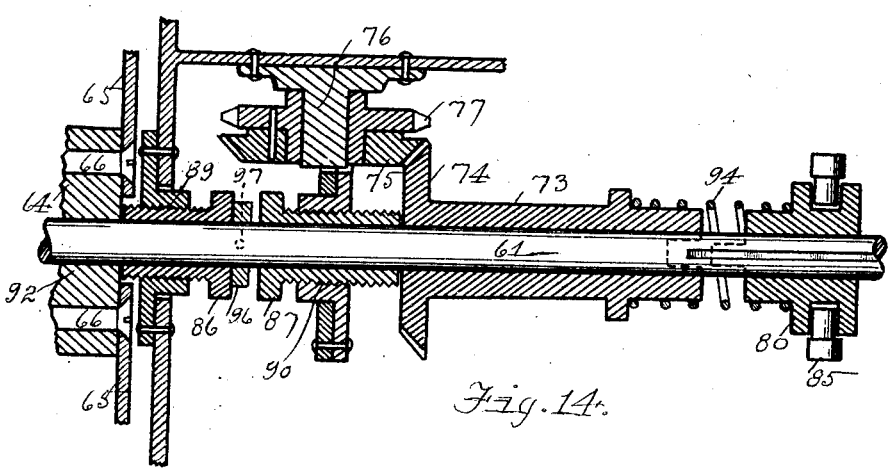
INVENTOR:
Oscar B. Clemens
BY Cyrus W. Rice
ATTORNEYS.

Patented Jan. 24, 1928.

1,657,109

UNITED STATES PATENT OFFICE.

OSCAR B. CLEMENS, OF GRAND RAPIDS, MICHIGAN.

FODDER CUTTER.

Application filed August 12, 1926. Serial No. 128,769.

The present invention relates to fodder cutters; and its object is, generally, to provide a machine of that character improved in various respects hereinafter appearing; and more particularly, to provide improved feeding means for such a machine; and further, to provide improved cutting means therefor; and further, to provide an improved casing for such cutting means; and further, to provide improved motion-transmitting parts and improved controls therefor in such a machine; and further, to provide such a machine adapted for storage in small space; and further, to provide improved features of construction and means of connection between the parts of a machine of this character—all as hereinafter described and explained.

These objects are attained by, and the invention finds preferable embodiment in, the structure hereinafter particularly described in the body of this specification and illustrated by the accompanying drawings, in which:—

Figure 2 is a top plan view thereof;

Figure 3 is a longitudinal vertical sectional view of certain parts of said machine, taken on line 3—3 of Figure 2;

Figure 4 is a transverse vertical sectional view of said parts, taken on line 4—4 of Figure 3;

Figure 5 is another transverse vertical sectional view of said parts, taken on line 5—5 of Figure 3;

Figure 6 is a transverse vertical sectional view of some of said parts, taken on line 6—6 of Figure 3;

Figure 7 is an inner side view of a portion of one of the heads or end members of a circular casing, its circumferential side member being shown in section, and the position and mounting of a cutting or shear bar being shown;

Figure 12 is a top plan view of a portion of the rear end of the structure showing its carrying wheels and said casing between them;

Figure 13 is an axially sectional view of certain motion-transmitting parts of the machine; and Figure 14 is an axially sectional view of certain other motion-transmitting parts of the same.

Figure 1:
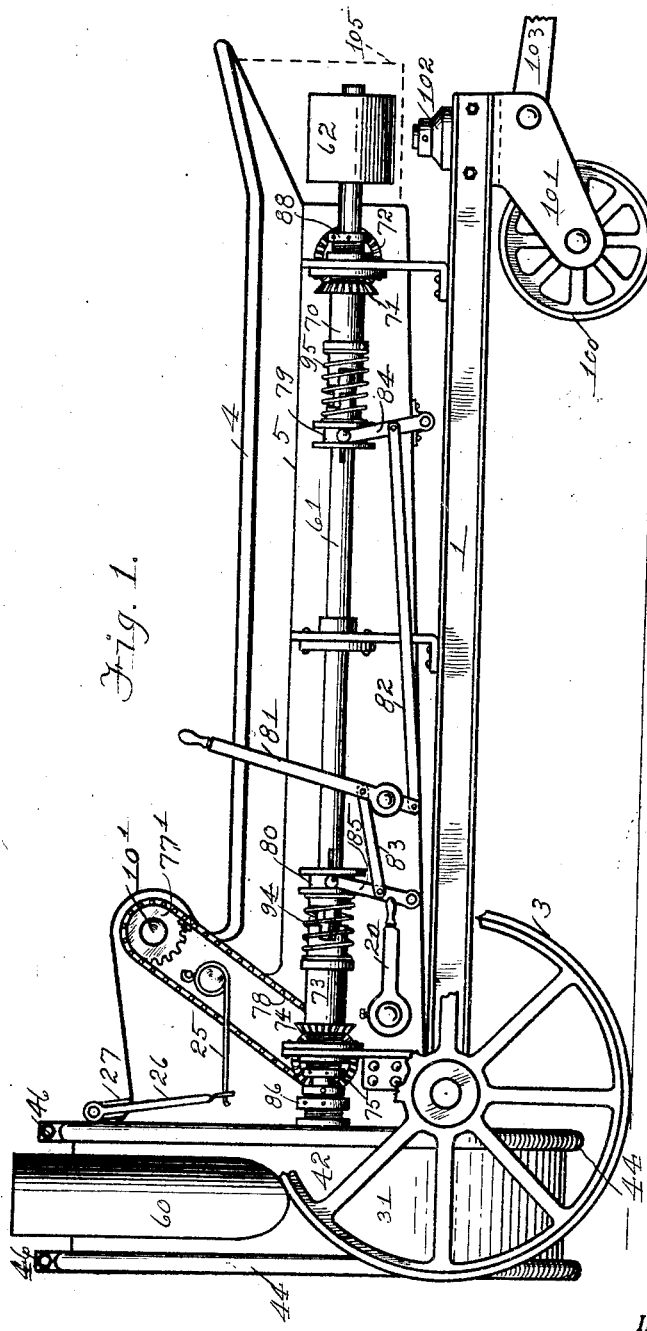
Figure 1 is a side view of a fodder cutting machine.
Figures 8, 10:
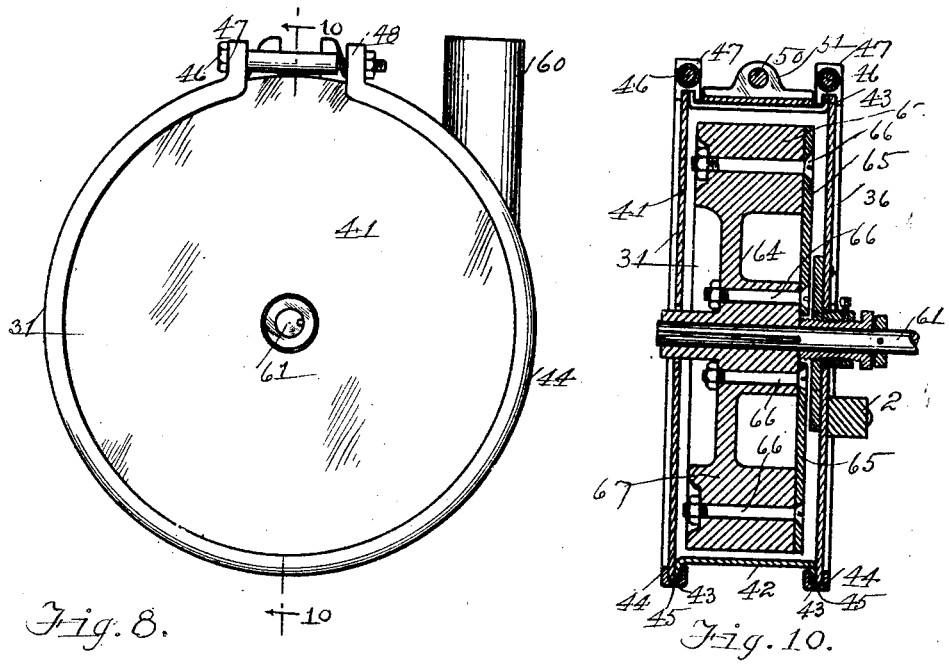
Figure 8 is a rear end view of said casing.
Figure 10 is a diametrical sectional view of said casing and of the cutting and work-expelling means inside it, taken on line 10—10 of Figure 8.
Figures 9, 11:
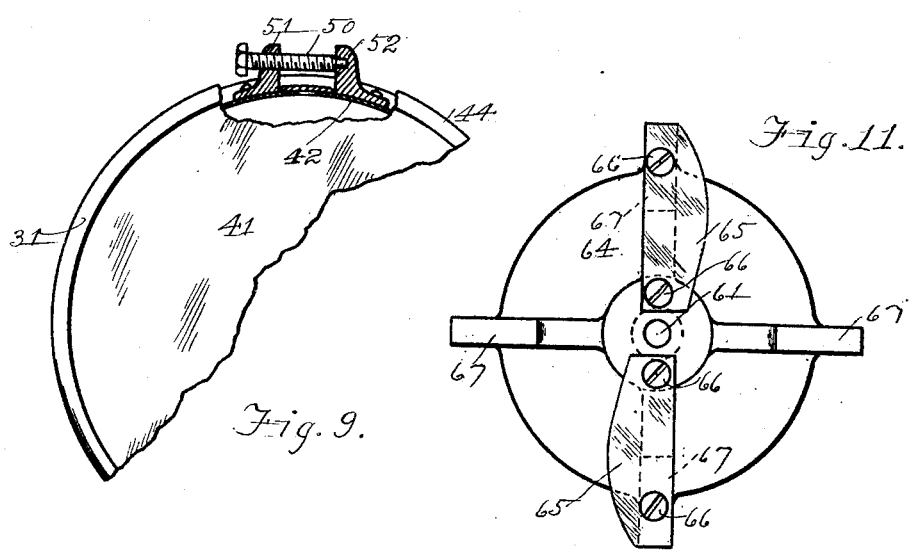
Figure 9 is a fragmentary rear end view of the same, certain parts being broken away.
Figure 11 is a face view of the knife blades of the cutting means and the rotatable head carrying the same.

In the embodiment of the invention illustrated by the accompanying drawings, my fodder cutter has a frame 1 preferably formed of metallic angle or channel bars, its rear end having an axle 2 on which turn the axially spaced carrying wheels 3. A receptacle or elongated hopper 4 carried on the frame is adapted to receive the "work", i. e., the fodder to be cut into short lengths for ensilage or the like. This hopper's open bottom 5 permits the fodder to fall on the feeding means, constructed and operating as follows:

A plurality of feeding bars 6 parallelly disposed and spaced apart by guiding work-supporting elements comprising, the plates 16 fastened at 7 on the bottom of the hopper's support 8, have an upwardly and forwardly operative movement toward the machine's cutting means in which movement these bars' serrations 9 engage and feed to the cutting means the fodder lying on the upper surface of the elements 16, said bars having a reverse or non-feeding movement in which their serrations move below the upper surface of the elements 16. These movements of the feeding bars are effected by the following means: The bars are given a circuitous movement in a vertical plane at their rear ends by the horizontal shaft 10, by the wrist pins 11 which have alternately oppositely disposed cranks 12 turning at 13 in the rear ends of the bars 6 respectively. The forward ends of these bars rest, and in said movements slide, on a horizontal bearing member extending transversely of the machine. This bearing member, as shown, is the eccentric cam member 14 journalled at 15 and having a lever handle 20 whereby it may be turned to desired position in order to raise or lower the forward ends of the feeding bars. These ends have their lower edges, which rest on the cam member 14, inclined at 21 relatively to the upper surfaces of the elements 16 as shown, so that the forward ends of the bars are elevated in their feeding movement above the upper surface of the elements 16 thus to effect such feeding, and are depressed below such surfaces in the bars' reverse or non-feeding movement.

It will be seen that, by turning this cam member 14, the feeding may be made faster or slower and the lengths in which the work is cut longer or shorter, inasmuch as in the lowered position of the forward ends of the bars 6 the work-engaging movement of their serrations is shorter in time and distance than when the forward ends of these bars are raised, and although the speed of the bars' movement be constant. The work-supporting elements 16 extend rearwardly only to approximately the position shown in Figure 3 so that the work being fed by the rear portions of the bars which are then raised by their cranks may be slid forwardly along the serrations or upper surfaces of the bars which are at the time relatively lowered.

Cooperating feeding means are shown adjacent the machine's cutting means, comprising feeding bars 6' whose operative lower edges or serrations 9' are inclined in a vertical plane relatively to the corresponding operative upper edges or serrations 9 of the feeding bars 6 of the lower feeding means. The bars 6' are carried at their rear ends on the crank wrist pins 11' of the shaft 10' in a manner similar to that in which the rear ends of the feeding bars 6 are mounted on their cranks. The forward ends of these bars 6' are inclined at 21' and are adapted to slide on the surface 14' of a member 22, being guided by their bolts 23 slidable in slots 24 in said member 22 and threaded in these bars respectively. The degree of separation of the forward ends of these bars 6' from said surface 14' may be limited by turning said bolts 23. These upper feeding bars 6' are pressed toward the lower feeding bars 6 by springs 25 connected by links 26, 27 to said member 22 which is turnably mounted on the shaft 10'. By this provision, the mass of the work passing between the upper and lower sets of feeding bars is yieldingly compacted as it passes to the cutting means through the opening 30 into the casing; and these sets of bars yield interrelatively to accommodate a greater or less thickness of the work passing therebetween.

A circular casing 31 is mounted on the rear of the machine's frame, and contains the cutting means. Such means includes a cutting bar or shear blade 32 having a middle or rear portion 33 and parallelly disposed side portions 34 extending forwardly from said rear portion and having cutting front edges 35. This cutting bar is removably mounted on the inner head or end member 36 of the casing at the opening 30 therethrough, by a supporting bar 37 secured as by bolts 38 to the cutting bar's rear portion 33 and between its side portions 34, this supporting bar 37 being carried by the inner head or end 36 of the casing as by bolts 40. It will be seen that inasmuch as the cutting edges 35 of this cutting bar are directed toward the interior of the casing, said cutting bar, even if accidentally loosened or detached from its supporting bar 37, cannot fall into the casing and into contact with the moving knife blades hereinafter described. The said casing 31 comprises the end members or heads 36 and 41 (being circular discs), a split circumferential side member 42 having radially extending flanges 43 at its sides, and split hoops 44, each having in its inner side a circular groove 45 receiving one of said flanges and the edge of one of the heads or end members. Means are provided for contracting the hoops, as the bolts 46 turning in the lugs 47 and threaded in the lugs 48 of the hoops, whereby the hoops are compressed to confine the edges of the end members or heads 36, 41 of the casing in the grooves 45. This being done, the circumferential side member 42 is expanded by means therefor provided, as the screw bolt 50 threaded in said member's lug 51 and bearing against its other lug 52. This side member's flanges 43 are thus pressed into the grooves 45, beside the edges of the end members 36, 41, to the desired degree. It will be seen that by these means the diameter of the space within the casing may be to some degree varied to accommodate varying conditions within the casing due to the amount or character of the work cut therein and being expelled through the discharge pipe 60 of the casing. It will be seen that the outer head or end member 41 of the casing may be removed by merely taking off the hoop 44 surrounding the same.

The main or driving shaft 61 of the machine, rotated as by its pulley 62 carrying a belt 63, extends in the longitudinal direction of the machine and carries at its rear end the circular head 64 to which knife blades 65 are secured as by screw bolts 66. These knife blades, by the rotation of said shaft, are carried into cutting cooperation with the cutting edges 35 of the fixed shear or cutting blade 37; and the radial wings 67 of the head 64 drive the cut work out of the casing through its tangential discharge pipe 60, from which it may be delivered through suitable pipes (not shown) to a desired place. The circumferential member 42 through which the discharge vent extends may be turned in the grooves 45 and clamped in desired position to direct the discharge pipe 60 as may be required.

The driving shaft 61 carries a clutch member 70 rotatably and slidably thereon having a bevel gear 71 meshing with a bevel gear 72 on the shaft 10; and also carries a clutch member 73 rotatably and slidably thereon having a bevel gear 74 meshing with a bevel gear 75 turning on a spindle 76 and carrying a sprocket wheel 77 on which and on the sprocket wheel 77' on the shaft 10' the sprocket chain 78 is carried. These clutch members 70 and 73 are clutched with their cooperating clutch members 79 and 80 respectively, splined on the driving shaft 61. These clutch members 79 and 80 are moved into and out of their clutching engagements by the lever 81, the links 82, 83 extending therefrom to the clutch forks 84, 85 respectively.

The sleeves 86, 87, 88 are threaded at 89, 90 and 91 respectively on the frame and surround the driving shaft. The sleeve 86 may be turned into abutting engagement with the hub 92 of the rotating head 64 to hold the knife blades 65 at proper distance from the shear or cutting blade 32; and the sleeves 87, 88 may be turned to hold the gears 74 and 71 in proper mesh with the gears 75 and 72 respectively, into which meshing engagement the gears 74, 71 are yieldingly pressed by the coiled springs 94, 95 respectively.

A collar 96 having a set screw 97 and abutting on the sleeve 86 serves to hold the driving shaft against longitudinal movement toward the rear of the machine.

The casing 31 being positioned between the wheels 3 and having a flat rear or outer side 41, the frame 1 may be raised to a vertical position, the axle 2 turning in the wheels, and the machine will then rest on said rear side 41 of the casing, thus occupying, when not in use, a narrow space. The forward end of the frame 1 is carried by a wheel 100 journalled in a yoke 101 turnable about a vertical axis 102. The vehicle tongue 103 carried by this yoke may be turned at right angles to the machine's longitudinal axis and fastened to the ground by a stake 104 to hold the machine against the drawing tendency of the driving belt 63 on the pulley 62. This pulley, and the driving shaft with its clutches, the gears and other operative parts at the machine's side, may be covered by a shield, part of which is indicated in broken lines at 105 in Figure 1.

It will be seen that the cutting contact of the knife blades 65 with the work may be so timed relatively to the feeding operation as to occur only at the intervals between successive feeding impulses.

The invention being intended to be pointed out in the claims, is not to be limited to or by details of construction of the particular embodiment thereof illustrated by the drawings or hereinbefore described.

I claim:

1. In mechanism of the character described, feeding means comprising: a feeding bar having at one end a circuitous movement in a vertical plane, and an inclined lower surface adjacent its other end; a bearing member on which said surface slides horizontally, and means to adjust said bearing member vertically.

2. In mechanism of the character described, feeding means comprising: a feeding bar having at one end a circuitous movement in a vertical plane, and an inclined lower surface adjacent its other end; a cam member on which said surface slides horizontally, said cam being turnable on a horizontal axis to adjusted positions.

3. In mechanism of the character described, feeding means comprising: an element having a work-supporting upper surface; a feeding bar adjacent and parallelly disposed relatively to said element and having at one end a circuitous movement in a vertical plane; a bearing member adjacent its other end on which the bar slides horizontally, said bearing member being movable vertically to positions in which the bar raised thereby operatively engages the work on said surface, and to another position in which the bar is permitted to fall to disengage the same.

4. In mechanism of the character described, feeding means comprising: a plurality of elements having work-supporting upper surfaces; a plurality of feeding bars between said elements; an axially-horizontal rotatable shaft having angularly-spaced cranks whose wrist pins turn in the bars respectively adjacent one of the ends thereof; a cam shaft adjacent its other ends on which the bars slide longitudinally, said shaft being turnable to positions in which the bars raised thereby operatively engage the work on said surfaces and to another position in which the bars are permitted to fall to disengage the same.

5. In mechanism of the character described, feeding means comprising: an element having a work-supporting upper surface; a feeding bar adjacent and parallelly disposed relatively to said element and having at one end a circuitous movement in a vertical plane, and an inclined lower surface adjacent its other end; a bearing member adjacent said other end on which the bar's said surface slides horizontally, said member being movable vertically to positions in which the bar raised thereby operatively engages the work on said element's upper surface and to another position in which the bar is permitted to fall to disengage the same.

6. In mechanism of the character described, a casing comprising: circular end members; a split circumferential side member having radially extending flanges; split hoops, each having in its inner side a circular groove receiving one of the flanges and the edge of one of the end members; means for contracting the hoops; means for expanding the circumferential side member.

7. In mechanism of the character described, a casing comprising: circular end members; a split circumferential side member having radially extending flanges; split hoops, each having in its inner side a circular groove receiving one of the flanges and the edge of one of the end members; threaded means carried by the hoops for contracting the same; threaded means carried by the circumferential side member for expanding the same.

8. In mechanism of the character described: a cutting bar having a rear portion and parallelly disposed side portions extending forwardly from the rear portion and having cutting front edges; a supporting bar for the cutting bar secured to its rear portion between its side portions.

9. In a machine of the character described: a pair of cooperating feeding means operatively engaging the work on its opposite sides; a driving shaft carrying cutting means; a clutch for coupling the shaft with one of the feeding means; another clutch for coupling the shaft with the other feeding means.

10. In a machine of the character described: a pair of cooperating feeding means operatively engaging the work on its opposite sides and driven by gears respectively; a driving shaft carrying cutting means and gears meshing with the first-mentioned gears respectively and rotatably and axially movable on the shaft; threadedly mounted sleeves surrounding the shaft turnable into abutting engagement with the cutting means and the second-mentioned gears respectively; clutches for coupling the second-mentioned gears respectively with the shaft.

11. In a machine of the character described: a pair of cooperating feeding means operatively engaging the work on its opposite sides and driven by gears respectively; a driving shaft carrying cutting means and gears meshing with the first-mentioned gears respectively and rotatably and axially movable on the shaft; threadedly mounted sleeves surrounding the shaft turnable into abutting engagement with the cutting means and the second-mentioned gears respectively; clutches for coupling the second-mentioned gears respectively with the shaft; springs pressing the second-mentioned gears into mesh with the first-mentioned gears respectively.

12. In a machine of the character described: a horizontal frame carried by a pair of axially spaced wheels; feeding means and cutting means carried by the frame, said cutting means comprising a knife blade carried by a shaft extending parallelly with the wheels; a casing enclosing the cutting means, and carried by the frame between the wheels, and having a flat outer end adapted to rest on the ground in the vertical position of the frame turned about the axis of the wheels.

In testimony whereof I have hereunto set my hand at Grand Rapids, Michigan, this 9th day of August, 1926.

OSCAR B. CLEMENS.